(12) United States Patent
Hutchins

(10) Patent No.: US 6,440,353 B1
(45) Date of Patent: Aug. 27, 2002

(54) VERTICAL TWIN-SHEET VACUUM FORMING METHOD

(76) Inventor: Paul Hutchins, 11932 King James Ct., Cape Coral, FL (US) 33991

( * ) Notice: Subject to any disclaimer, the term of this patent is extended or adjusted under 35 U.S.C. 154(b) by 0 days.

(21) Appl. No.: 09/453,119

(22) Filed: Dec. 2, 1999

(51) Int. Cl.⁷ .............................................. B29C 49/02
(52) U.S. Cl. ..................... 264/545; 264/547; 264/553; 264/572; 264/335; 264/138; 425/388
(58) Field of Search .................................. 264/545, 527, 264/529, 535, 536, 161, 547, 564, 566, 335, 568, 553, 512, 515, 572, 138; 425/387.1, 388

(56) References Cited

U.S. PATENT DOCUMENTS

| | | | |
|---|---|---|---|
| 2,918,698 A | | 12/1959 | Hagen et al. |
| 3,242,245 A | * | 3/1966 | Greig et al. .................. 264/89 |
| 3,837,517 A | | 9/1974 | Held |
| 3,971,687 A | | 7/1976 | Greer et al. |
| 4,117,061 A | | 9/1978 | Jorgenso |
| 4,423,000 A | | 12/1983 | Teraoka |
| 4,466,845 A | | 8/1984 | Fortuna |
| 4,617,077 A | * | 10/1986 | Giese et al. ................. 156/245 |
| 4,636,348 A | | 1/1987 | Whiteside |
| 5,108,529 A | | 4/1992 | Shuert |
| 5,168,621 A | | 12/1992 | Kruck et al. |
| 5,427,732 A | | 6/1995 | Shuert |
| 5,500,067 A | | 3/1996 | Jenkner |
| 5,554,422 A | | 9/1996 | Gill et al. |
| 5,595,239 A | | 1/1997 | Wolf et al. |
| 6,029,962 A | * | 2/2000 | Shorten et al. ............. 267/145 |

* cited by examiner

Primary Examiner—Jan H. Silbaugh
Assistant Examiner—Edmund H. Lee
(74) Attorney, Agent, or Firm—Anton J. Hopen; Smith & Hopen, P.A.

(57) ABSTRACT

A method of twin-sheet vacuum forming plastic articles having the steps of clamping two parallel sheets of thermoplastic synthetic resin in a vertical orientation to a clamping tray and blowing air between the parallel sheets thereby creating a hollow cavity between the two parallel sheets. The two parallel sheets are then heated to molding temperature between two vertically oriented heaters. The two parallel sheets are disposed between opposing mold cavities of a vertically oriented split mold wherein the mold cavities have a contour conforming the configuration of the desired article. A negative pressure is applied to suction holes provided in the mold cavities which draw the two parallel sheets against each opposing mold cavity. The split mold is then clamped together to form a pinch off around the perimeter of the hollow cavity thereby forming a molded hollow part still disposed within the clamping tray. Simultaneously, a blow pin inserted into the hollow cavity injects compressed air further presses the heated sheets against the mold cavities. The molded hollow part is allowed to cool to a set point and the vertically oriented split mold is opened. The clamping tray is withdrawn from the split mold and shuttled away from the mold cavities where the molded hollow part is cut away from the clamping tray, still in a vertical position.

15 Claims, 7 Drawing Sheets

FIG. 1

Prior Art

FIG. 2

Prior Art

FIG. 3

Prior Art

VERTICAL TWIN-SHEET VACUUM FORMING METHOD

FIELD OF INVENTION

The present invention relates generally to vacuum forming and more particularly to a method for twin-sheet vacuuming forming parts in a vertical orientation.

BACKGROUND OF THE INVENTION

Vacuum thermoforming generally refers to the process of heating a plastic material in sheet form to its particular processing temperature and forming the hot and flexible material against the contours of a mold by pneumatic means. When held to the shape of the mold and allowed to cool, the plastic retains the shape and detail of the mold.

A particular type of vacuum thermoforming is known as twin-sheet forming. In twin/dual-sheet forming, two sheets of plastic sheet are parallel-laid in a horizontal fashion and heated to a predetermined temperature. A blow pin is inserted between the two sheets and the upper and lower halves of a split mold close onto the sheets and pinch off around the entire perimeter. High pressure is then introduced between the two sheets from the blow pin, and a vacuum is applied to each of the two mold halves. However, a number of limitations exist with current twin-sheet forming technology. Current twin-sheet forming methods require precise controlled heating to ensure quality and consistent output from cycle to cycle. Because the sheets are horizontally oriented, the area in the center of the sheet tends to sag downward from natural gravity. Therefore, very precise and expensive heating controls must be employed to ensure that the plastic is evenly heated. As the material begins to soften it begins to sag downward, drawing away from the top heater and moving closer to the bottom heater, particularly in the center. This action requires precision zone heating controls to prevent the bottom sheet from getting too hot in the center as it moves down toward the bottom heater and the top sheets from being too cool in the center as it moves away from the top heater.

Another cause of sagging is that the melt index of the plastic is too high. Should this be the case, a plastic resin with a lower melt index is required thereby restricting the number of polymers available to utilize in the process.

Another aspect of current twin-sheet forming technology is that of trimming. Because a sheet of material must be clamped on its edges to allow stretching of the sheet into a shape, edge trim must be removed. For low volume, large sized molds, trimming is often manually performed in the forming station while the edge trim is still soft. However, manually cutting the molded article from the sheet is difficult as the sheet is in a horizontal position. This requires the operator to lean over the molded article to reach the outside perimeter of the pinch off. This is often difficult and sometimes dangerous should the operator lose his balance and fall onto the mold itself.

Another problem existing in current twin-sheet forming technology is the clamping pressure required to pinch off the perimeter of the molded article. Because the temperature of horizontally oriented sheets cannot become too hot without sagging, high clamping pressures must be utilized to form an effective pinch off. For high-quality parts, clamping pressures of 150 tons are not uncommon. Exerting this level of force on inexpensive molds often leads to cracking thereby destroying the mold. In addition, high clamping pressure requires more expensive tooling and operation of the apparatus.

Consequently, there is a need in the art for a method of twin-sheet forming that can form large parts without the sheets sagging from the force of gravity.

There is a further need in the art for a method of twin-sheet forming that does not require precise and expensive heating controls to heat the sheet evenly from end to end.

There is a further need in the art for a method of twin-sheet forming that presents the molded part to the manual trimming operator for easy trimming and safe removal of the part.

There is a further need in the art for a method of twin-sheet forming that requires less clamping pressure to pinch off the perimeter of the molded part.

There is a further need in the art for a method of twin-sheet forming that is able to utilize a wide variety of polymers while maintaining a high quality output.

There is a further need in the art for a method of twin-sheet forming that permits the use of less expensive composite molds such as fiberglass, ceramic, epoxy and the like over more expensive molds such as those fabricated from aluminum. It should be noted that aluminum molds may also be used if the part volume justifies the cost on certain models of parts. The present invention can accommodate aluminum and other metal type molds as well. Typically, however, these molds cost more, although usually less than blow molds.

However, in view of the prior art in at the time the present invention was made, it was not obvious to those of ordinary skill in the pertinent art how the identified needs could be fulfilled.

SUMMARY OF THE INVENTION

The present invention solves significant problems in the art by providing a method of twin-sheet vacuum forming plastic articles comprising the steps of clamping two parallel sheets of thermoplastic synthetic resin in a vertical orientation to a clamping frame, the two parallel sheets in direct contact with each other about the perimeter of the clamping tray, and blowing air between the parallel sheets thereby creating a hollow cavity between the two parallel sheets. The two parallel sheets are then heated evenly in vertical orientation to molding temperature. The two parallel sheets are disposed between a first opposing mold cavity and a second opposing mold cavity of a vertically oriented split mold wherein the mold cavities have a contour conforming the configuration of the desired article. A negative pressure is applied to suction holes provided in the mold cavities, which draw the two parallel sheets against each opposing mold cavity as the split mold is being clamped together. The split mold is then clamped together to form a pinch off around the perimeter of the hollow cavity thereby forming a molded hollow part still disposed within the clamping frame. Simultaneously, a blow pin inserted into the hollow cavity injects compressed air, further pressing the heated sheets against the mold cavities.

In a preferred embodiment, at least four substantially equidistant spacers are positioned along the circumference of a first mold frame holding the first opposing mold cavity. A second mold frame holding the second opposing mold cavity may be fitted with apertures to slideably receive guide pins projecting from the spacers. The spacers provide a positive stop before the peripheries of the first and second mold frame come into contact. By placing the spacers between the two frames, a gap forms around the perimeter of the first and second mold frames while they are pressed together. This gap provides a pathway for plastic to escape. Otherwise, if the plastic were compressed along the entire perimeter of the first and second mold frames, high press force would be required to press the plastic down in order to properly close the mold. Another benefit of using the spacers is that the pinch offs are protected from damage, particularly when composite materials are used to construct the mold such as fiberglass, ceramic and epoxy. The spacers allow for less press force while providing precise clamping of each opposing mold cavity. Escape holes in the frame under the female guide prevents plastic from building upon the pins.

The molded hollow part is allowed to cool to a set point and the vertically oriented split mold is opened. The mold may be cooled externally with a water spray or may be cooled internally using water conduits.

The molded hollow part may be ejected from the split mold by blowing compressed air through the vacuum suction holes. The clamping tray is withdrawn from the split mold and shuttled away from the mold cavities where the molded hollow part is cut away from the clamping tray, still in a vertical position. In a preferred embodiment, a rail means in provided for sliding the clamping tray to and from the oven, the split mold and a cutting location. The cutting location is adapted to permit manual trimming of the molded hollow part wherein the operator has a physical range of motion free from encumbrances.

An object of this invention is to provide an inexpensive method of twin-sheet vacuum forming large plastic parts in low volumes.

Another object of this invention is to provide a method of twin-sheet vacuum forming that permits higher heating levels.

Another object of this invention is to provide a method of forming large hollow parts without the expense or complexity of blow molding.

Another object of this invention is to provide a method of twin-sheet vacuum forming that produces a high quality article using less expensive plastic resin with a lower melting point.

Another object of this invention is to provide a method of twin-sheet vacuum forming which requires less heat control.

Another object of this invention is to provide a method of twin-sheet vacuum forming that permits easier trimming of the article.

Another object of this invention is to provide a method of twin-sheet vacuum forming large articles without significant deformation from the effects of gravity.

Another object of this invention is to provide a method of twin-sheet vacuum forming that keeps each individual thermoplastic sheet from sticking to each other.

Another object of this invention is to provide a method of twin-sheet vacuum forming that permits the use of inexpensive composite-type molds, such as fiberglass, ceramic, epoxy and the like. Composite materials usually consist of synthetic fibers embedded within a matrix, a material that surrounds and is tightly bound to the fibers. The most widely used type of composite material is polymer matrix composites (PMCs). PMCs consist of fibers made of a ceramic material such as carbon or glass embedded in a plastic matrix. Typically, the fibers make up about 60 percent of a polymer matrix composite by volume. Metal matrices or ceramic matrices can be substituted for the plastic matrix to provide more specialized composite systems called metal matrix composites and ceramic matrix composites, respectively. These composite materials are generally substantially less expensive to fabricate in comparison to aluminum molds typically used which may increase costs over composites by a magnitude. Traditionally, composite molds have been used in single sided vacuum forming where there are no clamping forces at a pinch off.

Another object of this invention is to provide a method of twin-sheet vacuum forming that requires less clamping pressure and subjects the mold to a reduced amount of press force.

An advantage of the invention is that sheets may be heated to a higher temperature without sagging. Higher heat produces a better pinch off, improved consistency and lessens thinning out of the walls of the resultant part.

Another advantage of the invention is that less expensive polymer resin may be used that has a lower melt point.

Another advantage of the invention is that less heat control is required to maintain a proper shape without sagging.

Another advantage of the invention is that the vertical orientation of the sheets while heating permits the two sheets to remain vertically parallel to both heaters and expand evenly from side to side as they approach molding temperature.

Another advantage of the invention is that the resultant part may be trimmed while standing in a more comfortable and safe position than leaning over a horizontal system.

Another advantage of the invention is that high-quality, large parts may be produced in low volumes without expensive equipment or costly mold methods.

Another advantage of the invention is that it provides manufacturers of low volume, large hollow parts with a less expensive and less complicated means to manufacture parts in-house that were previously molded by using a large blow molding machine.

Another advantage of the invention is that parts can be molded using pre-decorated plastic sheets on one or both sides of the exterior surfaces to create a unique, decorative look such as an automotive rear-deck spoiler so as to give it the appearance that it was made from carbon fiber, wood grain, or other materials. This appearance is impossible to achieve in the conventional blow molding process.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
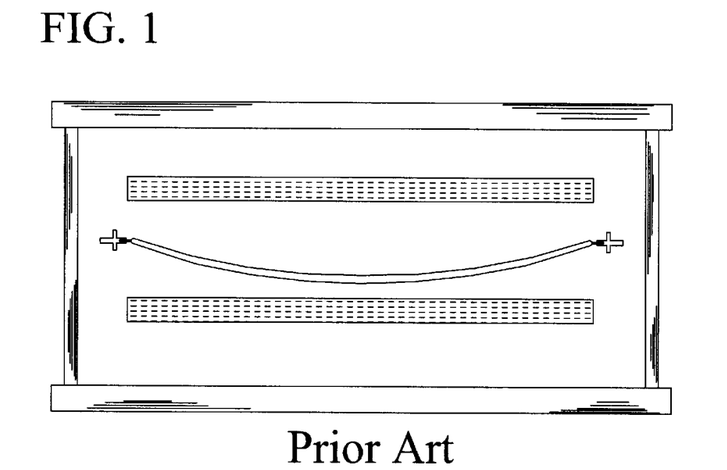
FIG. 1 is a side sectional elevated view of the prior art showing two clamped heated sheets moving away from the top heater and moving down toward the bottom heaters as a result of gravitational sag.
Figure 2:
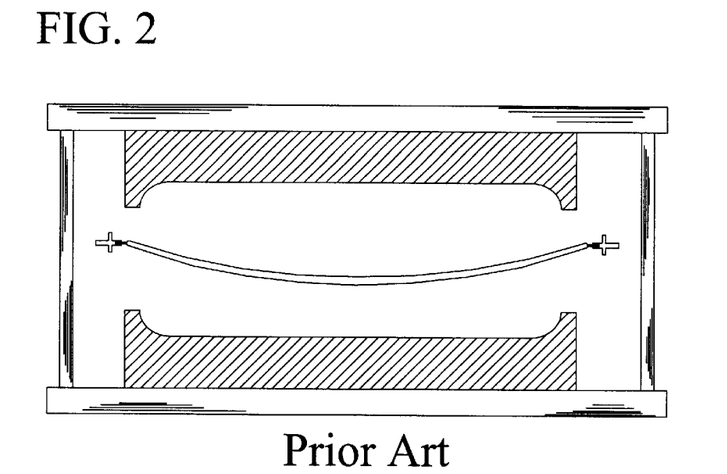
FIG. 2 is a side sectional elevated view of the prior art showing sheets hanging down away from the top mold cavity and hanging down into the lower mold.
Figure 3:
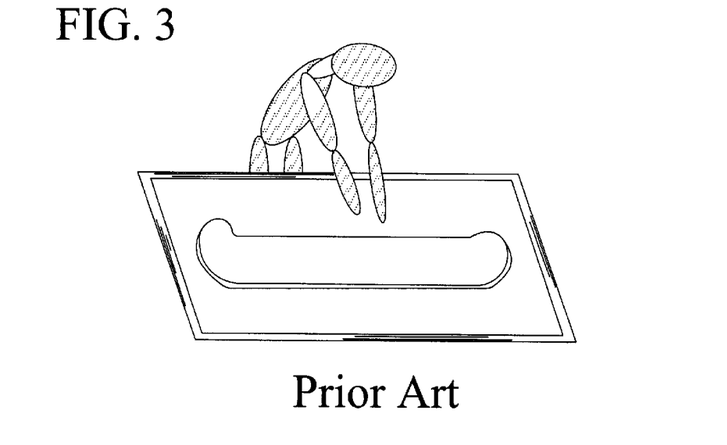
FIG. 3 is an isometric view of the prior art showing a worker leaning over a horizontally oriented large molded part.

Referring initially to FIGS. 1 and 2, it will there be seen that in the prior art, horizontally oriented sheets of thermoplastic resin often sag by force of gravity. This may limit the size of the article that can be efficiently fabricated. Furthermore, sophisticated and expensive heat controls are increasingly required to maintain proper heating throughout the part. FIG. 3 illustrates another drawback of the prior art. For large articles produced in low volume it is often desirable to manually cut the article from the clamping tray while the thermoplastic resin is still soft. When cutting a large article in a horizontal orientation, it is necessary to lean over the article and to extend the worker's reach. This is inefficient, uncomfortable and unsafe. When handling large articles, it would be preferable to work in an upright position.

Figure 4:
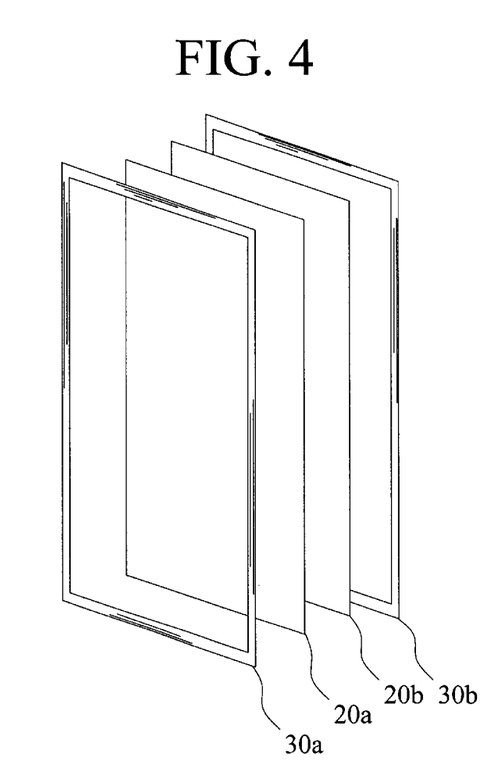
FIG. 4 is an exploded isometric view of twin parallel sheets of thermoplastic synthetic resin in a vertical orientation sandwiched between two clamping frames.

FIG. 4 shows an exploded view of two parallel sheets of thermoplastic synthetic resin 20a–b in a vertical orientation being sandwiched at their periphery by two frames 30a–b that combine to form a clamping tray 30 which rigidly secures said two parallel sheets of thermoplastic synthetic resin 20a–b.

Figure 5:
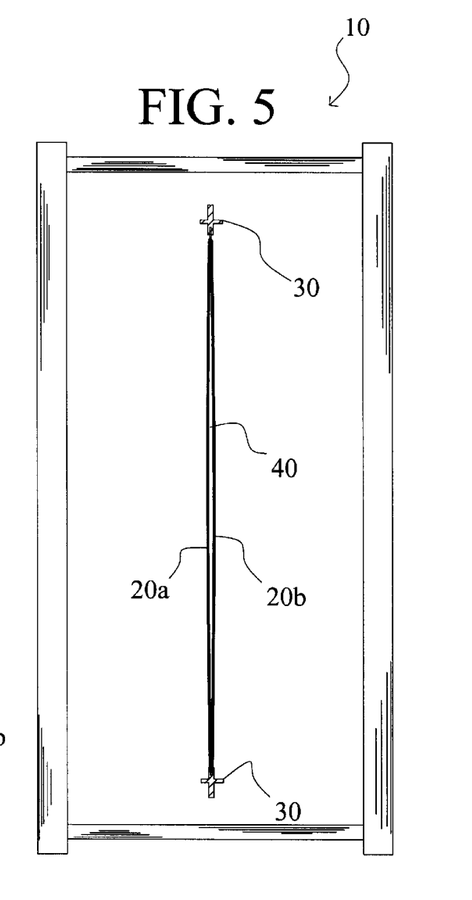
FIG. 5 is a side sectional elevated view of the twin parallel sheets of thermoplastic synthetic resin clamped together and a hollow cavity of air formed between the two sheets.
Figure 5A:
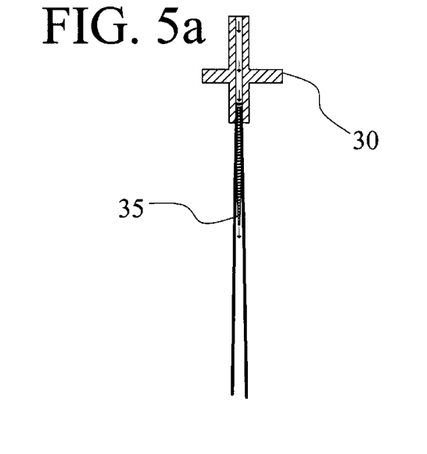
FIG. 5a is a side sectional elevated detailed view of the clamping tray blow pin with a continuous flow of air being injected between the twin vertical parallel sheets.

FIG. 5 shows said two vertically oriented parallel sheets of thermoplastic synthetic resin 20a–b secured by said clamping tray 30. Air is blown between said two parallel sheets of thermoplastic synthetic resin 20a–b by a clamping tray blow pin 35 (FIG. 5a) to create a hollow cavity 40.

Figures 6, 7:
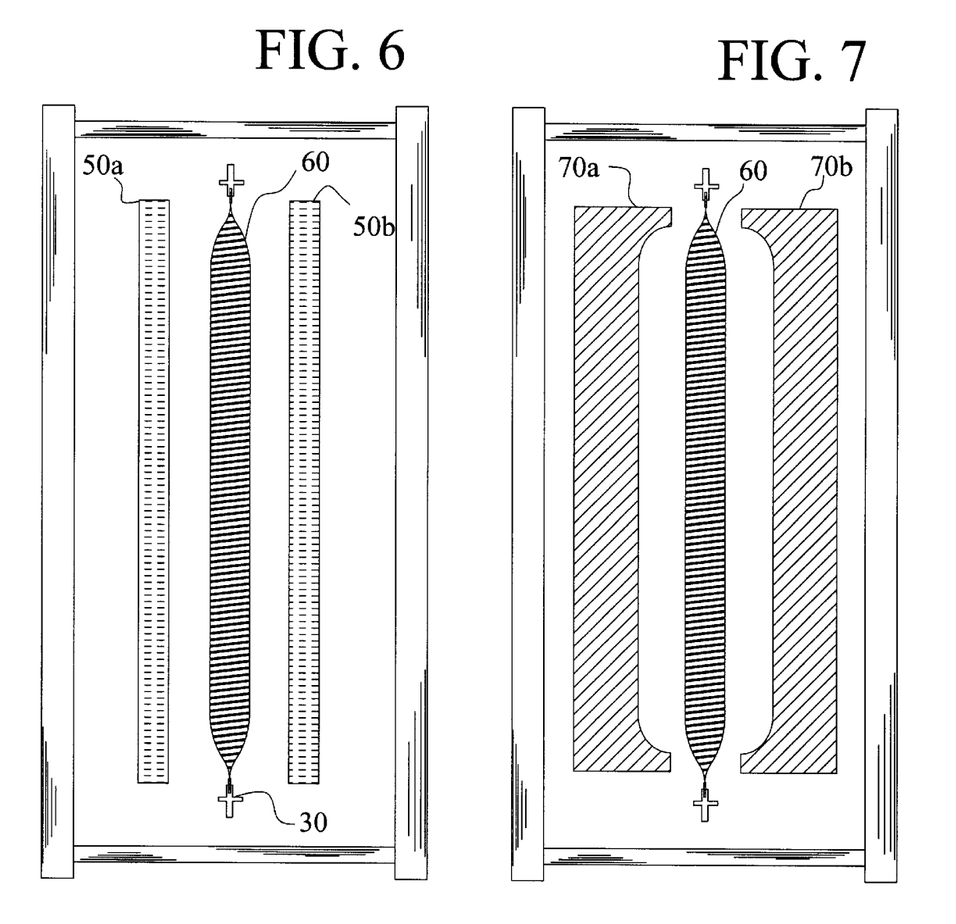
FIG. 6 is a side sectional elevated view of the twin vertical parallel sheets between two vertical parallel heaters to form a vertical plastic balloon remaining evenly parallel to the heater as it softens to molding temperature thereby forming a hollow plastic part.
FIG. 7 is a side sectional elevated view of opposing mold cavities of a vertically oriented split mold on each side of a vertical plastic balloon, which allows the hollow part to remain evenly parallel to the mold.

In FIG. 6, vertically oriented heating elements 50a–b are applied to said two parallel sheets of thermoplastic synthetic resin 20a–b to form a single hollow article 60. Air is continually injected by said clamping tray blow pin detailed in FIG. 5a into said hollow cavity 40 which continues to expand to form a pillow effect. The vertical orientation of the operation prevent plastic from sagging into or away from said vertically oriented heating elements 50a–b as illustrated in FIG. 1.

In FIG. 7 said hollow article 60 is disposed between vertically oriented opposing mold cavities 70a–b having a contour conforming to the configuration of the desired article. It should be noted that said mold cavities may be adapted to form a plurality of molded hollow parts (i.e., a multi-cavity mold).

Figure 8:
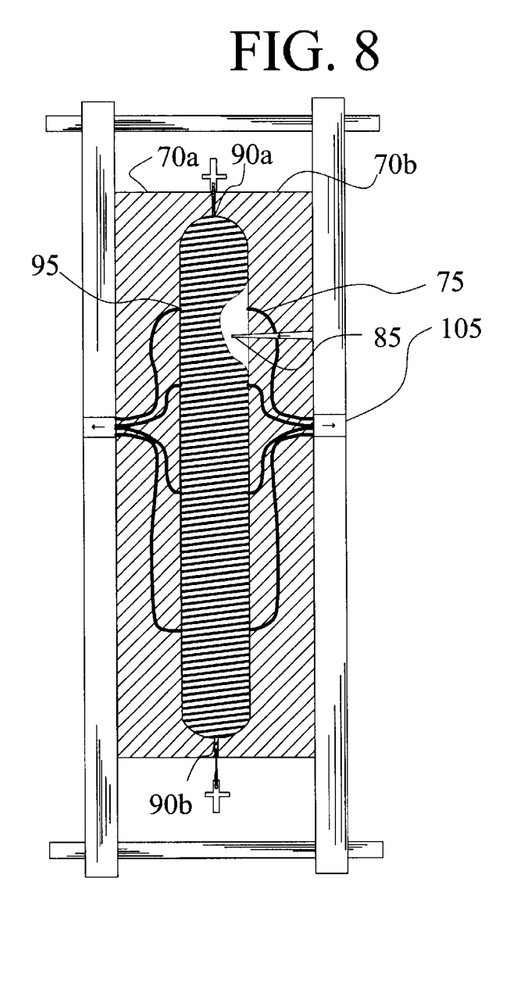
FIG. 8 is a side sectional elevated view of the mold cavities of the vertically oriented split mold clamped to the single hollow part and a partial sectional view of the blow pin inserted into the single hollow part.

FIG. 8 shows the vertically oriented opposing mold cavities 70a–b sandwiching the hollow article 60 wherein vacuum suction holes 95 provided in the mold cavities apply negative pressure to the walls of the hollow article 60 by connection 75 to a vacuum means 105 thereby drawing them up against the contours of the opposing mold cavities 70a–b. In a substantially concurrent fashion, a blow pin 85 is inserted into the hollow article 60 and compressed air is blown into the hollow cavity 40 by a plenum means thereby pushing the walls of the hollow article 60 up against the contours of the opposing mold cavities 70a–b. Around the perimeter of the hollow article 60 is a pinch off 90a–b. The hollow article 60 must be allowed to cool to the set point of the thermoplastic resin before the opposing mold cavities 70a–b can be withdrawn.

Figure 9:
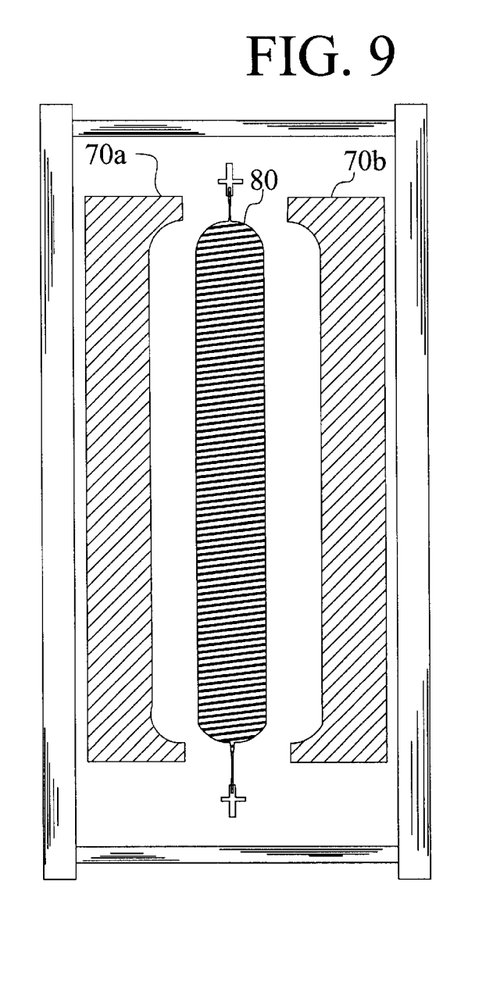
FIG. 9 is a side sectional elevated view of the mold cavities withdrawn from the single hollow part.

In FIG. 9, the vertically oriented mold cavities are withdrawn leaving the newly formed part 80 which reflects the contours of the opposing mold cavities 70a–b.

Figure 10:
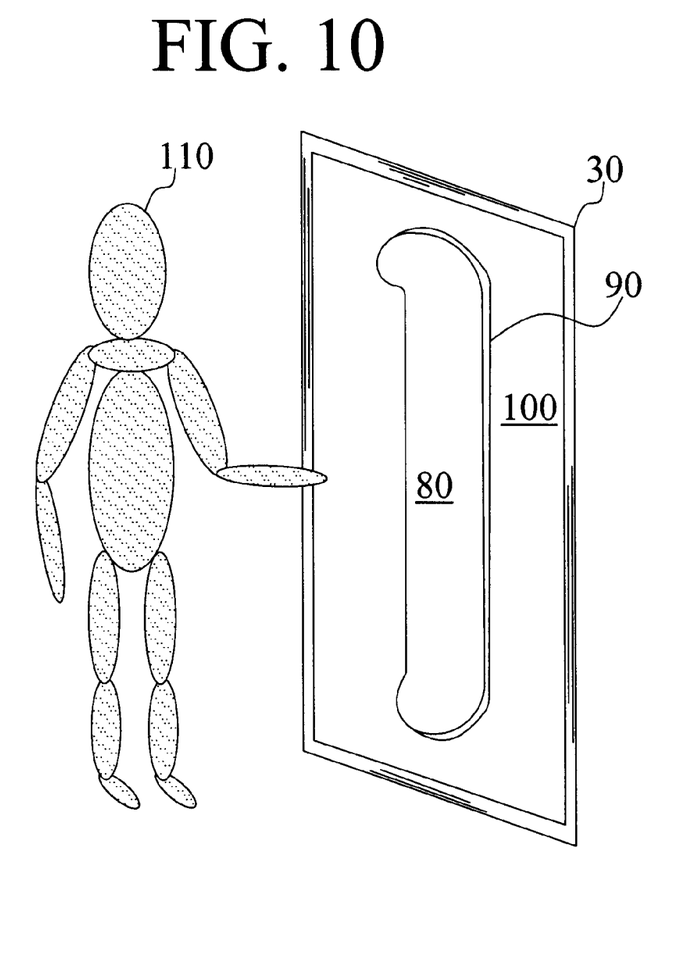
FIG. 10 is an isometric view of a worker standing next to the vertically oriented hollow part still attached to the clamping frames.

In FIG. 10, a benefit to the vertical orientation is illustrated wherein a worker 110 can cut out the newly formed part 80 out of the remaining unformed thermoplastic resin 100 by trimming around the pinch off 90 while the thermoplastic resin is still warm and still clamped within the clamping tray. The worker does not need to lean over the newly formed part 80 as was illustrated in FIG. 3. In a vertical orientation, the worker 110 is in a more comfortable position to work with and handle the newly formed part. Accordingly, a worker using the current invention suffers less fatigue and risk of injury. Furthermore, the worker is able to trim the newly formed part while at eye-level with his work. This enables a more efficient and accurate handling of the part.

Figure 11:
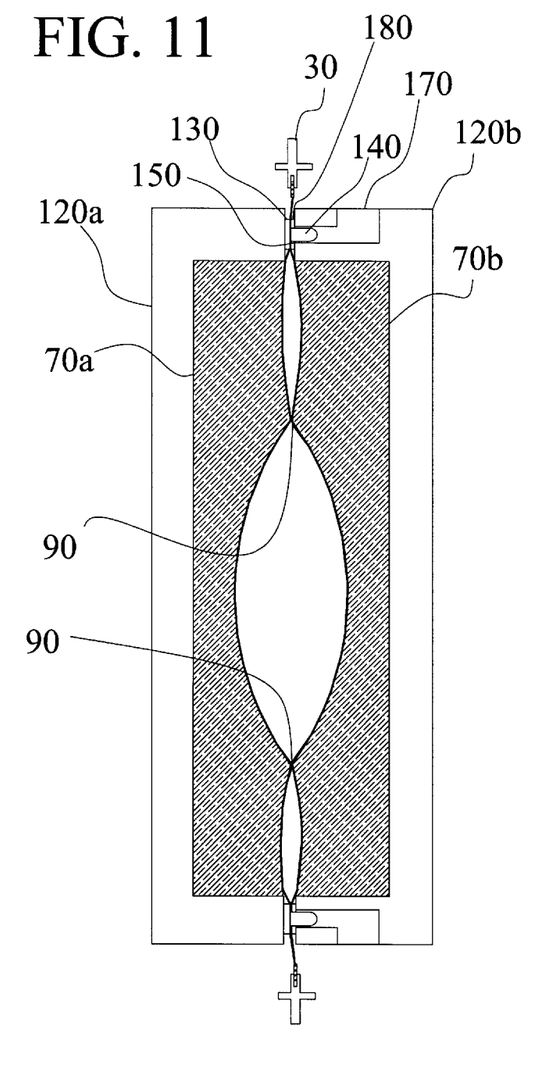
FIG. 11 is a side sectional elevated view of the mold cavities of the vertically oriented split mold clamped together showing the spacers and the pinch offs.
Figure 12:
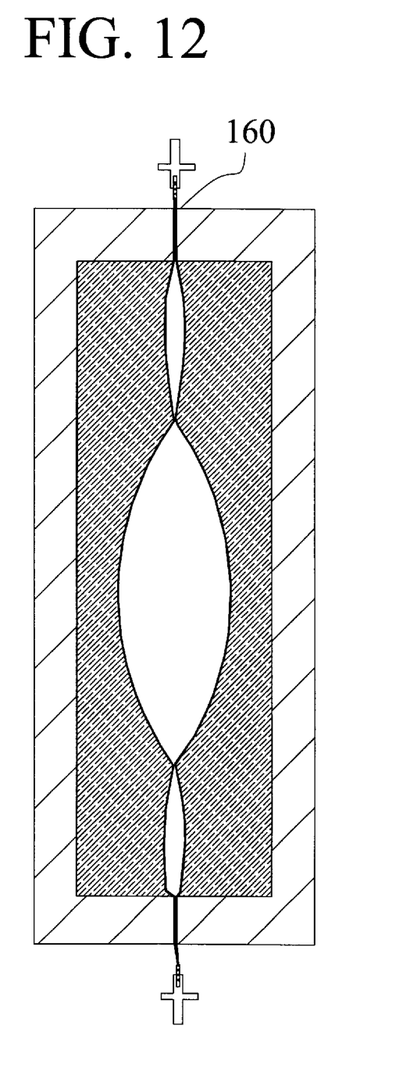
FIG. 12 is a side sectional elevated view of the mold cavities of the vertically oriented split mold clamped together without spacers thereby illustrating the plastic compressed between the two mold frames.
Figure 13:
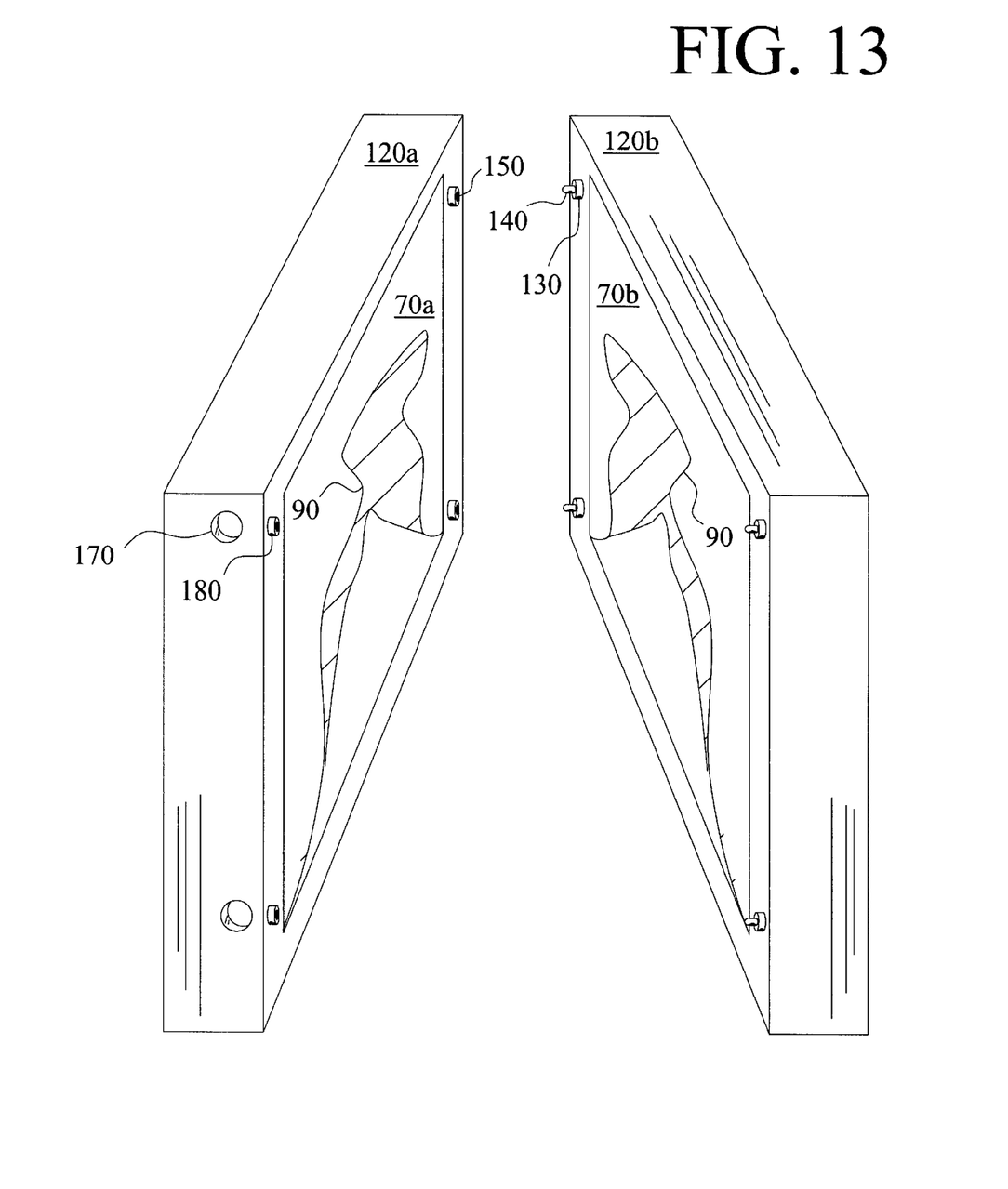
FIG. 13 is an exploded isometric view of the first and second mold frames in opposing orientation fitted with spacers on each corner.

In FIGS. 11 and 13, a first mold frame 120a holding the first opposing mold cavity 70a is fitted with at least four substantially equidistance spacers 130. A second mold frame 120b holding the second opposing mold cavity 70b is fitted with apertures 150 adapted to slideably receive guide pins 140 projecting from the spacers 130. It can been seen that the spacers provide a positive stop before the peripheries of the first mold frame 120a and the second mold frame 120b come into contact. This permits compressed plastic to flow around the spacers which lessens the amount of press force required. Alternatively, FIG. 12 is illustrative of the situation without spacers and it can be seen that a substantial amount of plastic 160 must be compressed around the entire perimeter of the mold frames rather than just at four spacer points as shown in FIG. 13. Furthermore, the spacers 130 prevent the pinch offs 90 from being damaged by over compression. This is particularly important when less resilient mold materials are used such as fiberglass, ceramic and epoxy.

The apertures 150 are sleeved with an opposing stop collar 180 and an exit pathway 170 provides a route for the plastic captured on the head of the guide pins 140 to escape and avoid accumulation.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of twin-sheet vacuum forming plastic articles comprising the steps of:
   (a) clamping two parallel sheets of thermoplastic synthetic resin in a vertical orientation to a clamping tray, said two parallel sheets in direct contact with each other about the perimeter of said clamping tray;
   (b) blowing air between said parallel sheets thereby creating a hollow cavity between said two parallel sheets;
   (c) heating said two parallel sheets to molding temperature in a vertical orientation;
   (d) opening a vertically oriented split mold having mold cavities with a contour conforming to the configuration of the desired article;
   (e) disposing said two parallel sheets between the opposing mold cavities of said vertically oriented split mold;
   (f) applying negative pressure to vacuum suction holes provided in the mold cavities of said vertically oriented split mold;
   (g) closing said split mold to form a pinch off around the perimeter of said hollow cavity thereby forming a molded hollow part still disposed within said clamping tray;
   (h) simultaneously inserting a blow pin into said hollow cavity and blowing compressed air into said hollow cavity to push said two parallel sheets against the mold cavities;
   (i) cooling said molded hollow part to a set point; and
   (j) opening said vertically oriented split mold and withdrawing said clamping tray.

2. The method of claim 1 further comprising the step of ejecting said molded hollow part from said vertically oriented split mold by blowing compressed air through said vacuum suction holes.

3. The method of claim 2 wherein the compressed air blown through said vacuum suction holes is pressurized to at least 20 pounds per square inch.

4. The method of claim 1 further comprising the step of providing a rail means for sliding said clamping tray to and from an oven, said vertically oriented split mold and a cutting location, said cutting location adapted to permit manual trimming of said molded hollow part free from encumbrances.

5. The method of claim 1 wherein the air blown between said two parallel sheets is pressurized from about 5 to 10 pounds per square inch.

6. The method of claim 1 wherein the air blown into said hollow cavity is pressurized from about 30 to 40 pounds per square inch.

7. The method of claim 1 wherein said closing of said split mold is effected at a pressure of at least 10 tons.

8. The method of claim 1 wherein said vertically oriented split mold is externally cooled with a spray of water.

9. The method of claim 1 wherein said vertically oriented split mold is internally cooled with water.

10. The method of claim 1 wherein said vertically oriented split mold has a plurality of cavities adapted to form a plurality of molded hollow parts.

11. The method of claim 1 wherein said mold cavities are constructed of composite material.

12. The method of claim 1 further comprising the step of equidistantly placing at least four or more spacers on a first mold frame holding a first opposing mold cavity wherein said at least four or more spacers provide a positive stop gap between said first mold frame and a second mold frame holding a second opposing mold cavity, said first and second mold frames comprising said split mold.

13. The method of claim 12 further comprising the step of fitting said second mold frame with apertures adapted to slideably receive a guide pin projecting from each of said at least four or more spacers.

14. The method of 13 further comprising at least one or more exit pathways adapted to provide a route for plastic captured on said guide pin to escape and avoid accumulation.

15. The method of claim 1 further comprising the step of manually cutting said molded hollow part from said clamping tray in a vertical upright position.

* * * * *